United States Patent [19]
Enge et al.

[11] Patent Number: 5,465,413
[45] Date of Patent: Nov. 7, 1995

[54] ADAPTIVE NOISE CANCELLATION

[75] Inventors: Per Enge, Los Altos; Dominic Farmer, Milpitas; Brian Westfall, Mountain View, all of Calif.

[73] Assignee: Trimble Navigation Limited, Sunnyvale, Calif.

[21] Appl. No.: 27,004

[22] Filed: Mar. 5, 1993

[51] Int. Cl.$^6$ .................................................... H04B 1/12
[52] U.S. Cl. ........................................ 455/307; 375/349
[58] Field of Search ............................. 375/99, 101–103; 455/296, 303–307

[56] References Cited

U.S. PATENT DOCUMENTS

| | | | |
|---|---|---|---|
| 3,541,458 | 11/1970 | Klund . | |
| 4,067,013 | 1/1978 | Smith | 455/307 |
| 4,092,603 | 5/1978 | Harrington | 455/303 |
| 4,177,430 | 12/1979 | Paul | 455/306 |
| 4,220,926 | 9/1980 | Buckner | 455/303 |
| 4,287,475 | 9/1981 | Eaton et al. | 455/306 |
| 4,363,138 | 12/1982 | Franklin et al. | 455/296 |
| 4,537,200 | 8/1985 | Widrow | 128/696 |
| 4,649,505 | 3/1987 | Zinsnower, Jr. et al. | 379/411 |
| 4,719,466 | 1/1988 | Farina et al. | 342/159 |
| 4,792,964 | 12/1988 | Yoshida | 375/118 |
| 4,847,860 | 7/1989 | Robert | 455/304 |
| 4,901,150 | 2/1990 | Klingelhofer et al. | 455/296 |
| 4,912,398 | 4/1990 | Jove et al. | 455/303 |
| 5,008,903 | 4/1991 | Betts et al. | 375/60 |
| 5,018,088 | 5/1991 | Higbie | 364/574 |

*Primary Examiner*—Edward F. Urban
*Assistant Examiner*—Mark D. Wisler
*Attorney, Agent, or Firm*—John Schipper

[57] ABSTRACT

Method and apparatus for reducing or cancelling impulse noise from a signal containing noise. The desired noise-free signal is assumed to have a representative frequency $\omega_3$, but may have a range of frequencies adjacent to this frequency, and is assumed to have substantially zero amplitude for all frequencies $\omega<\omega_1$ and/or for all frequencies $\omega>\omega_2$, where $\omega_1<\omega_3<\omega_2$ or $\omega_1<\omega_2$. An input (noisy) signal is filtered and analyzed in a narrow frequency region surrounding $\omega=\omega_1$ and/or a narrow frequency region surrounding $\omega=\omega_2$ to obtain one or two output signal components $n_1(t)$ and/or $n_2(t)$, respectively, that, ideally, contain no contribution from the desired signal. The input signal is also filtered and analyzed in a narrow frequency region surrounding $\omega=\omega_3$ to obtain an output signal $s(t)+n_3(t)$ component including the desired signal $s(t)$. A linear combination of signals, such as $S(t)=s(t)+n_3(t)\pm[n_1(t)n_2(1)]^{1/2}$, or $S(t)=s(t)+n_3(t)+\alpha\exp(-j\phi)[n_1(t)n_2(1)]^{1/2}$, or $S(t)=s(t)+n_3(t)\pm n_k(t)$ (k=1,2), or $S(t)=s(t)+n_3(t)+\exp(-j\phi)n_k(t)$, or $S(t)=s(t)+n_3(t)+[\exp(-j\psi1)n_1(t)+\exp(-j\psi2)\,n_2(t)]/2$, or $S(t)=s(t)+n_3(t)+\alpha[\exp(-j\psi)\,n_1(t)+\exp(-j\psi)\,n_2(t)]/2$, is formed as a circuit output signal, and the $\pm$ sign and/or the multiplier $\alpha$ and/or the phase angles $\phi$, $\psi1$, $\psi2$ and $\psi$ are chosen to minimize the contribution of noise to $S(t)$, according to a selected quantitative error measure. Three such error measures are the displacement of a signal from the median of a reference signal, the cumulative variation of a signal, and the least mean square value of a signal. Other combinations of the signals $n_1(t)$ and $n_2(t)$, replacing the (complex) arithmetic mean and geometric mean, may be used for the linear combination signal $S(t)$. Methods for computation of the phase angles $\phi$, $\psi1$, $\psi2$ and $\psi$ are also disclosed.

26 Claims, 10 Drawing Sheets

ADAPTIVE NOISE CANCELLATION

FIELD OF THE INVENTION

This invention relates to adaptive processing of noisy electrical signals to reduce or cancel impulse noise.

BACKGROUND OF THE INVENTION

Electrical signals often include an undistorted signal component and a noise component, where the noise arises from several sources, including white or Gaussian noise, temperature-induced Johnson noise, impulse noise, crosstalk noise, echo noise, intermodulation noise, amplitude noise, jitter noise, uncontrolled voltage variation, and several varieties of signal distortion. Gaussian noise has been studied widely, and many techniques exist to control or reduce the effects of Gaussian noise. Impulse noise has received less attention.

Klund, in U.S. Pat. No. 3,541,458, discloses use of an adaptive array of sensors to detect a weak (desired) signal in the presence of noise. The amplitude weights and phases assigned to the different sensors are varied to produce a signal that, ideally, is free of the spatially stationary component of the noise field. The invention uses a Fourier series representation for the waveform produced by each sensor and uses time averaging and other manipulations to identify the optimal amplitudes and phases assigned to each sensor.

An adaptive broadband noise cancellation signal receiver is disclosed in U.S. Pat. No. 4,177,430, issued to Paul. A desired radiofrequency passband is selected, and an input signal in this band is converted to an intermediate frequency broadband signal. The converted input signal is passed through two parallel signal processing channels having differing frequency characteristics. The first channel output represents desired signal plus noise, and the second channel output represents primarily noise, after filtering by an adaptive transversal filter. The two channel outputs are then subtracted from each other to produce a waveform that is primarily the desired signal. The adaptive filter shuts off if the first and second channel outputs have no audio component in common and emphasizes any broadband noise that is present.

Eaton et al disclose a circuit for suppression of narrowband interference noise (as opposed to white noise), in U.S. Pat. No. 4,287,475. The received signal, containing the desired signal plus narrowband noise plus wideband noise, is discrete Fourier transformed using a chirp algorithm illustrated in Fourier space in FIG. 3. Sidelobes are suppressed by about 40 dB relative to a center peak by additional filtering. The resulting signal is smoothed to produce a power spectral density function, apparently representing the narrowband noise, which is used to notch out this noise in the time domain.

U.S. Pat. No. 4,537,200, issued to Widrow, discloses a system for electrocardiogram signal enhancement by adaptive cancellation of noise created by operation of an electrosurgical instrument, such as a "Bovie", used for cauterizing tissue cut by an adjacent surgical knife. Gross interference noise is filtered out by use of passive lowpass and active lowpass filters. A first waveform, consisting of the desired signal plus a first noise signal, and a second waveform, consisting of a second noise signal only, are formed, with the two noise waveforms being correlated with each other but not with the desired signal. The second noise waveform only is passed through an adaptive filter, which consists of a tapped delay line, with the tapped off signals being weighted and summed to form a Least Mean Squares (LMS) estimate of the first noise waveform. The first and second waveforms are then subtracted from each other. The resulting difference signal, representing the desired signal, is fed back to the adaptive filter to determine, in a time varying manner, an LMS estimate of the first noise waveform.

Zinser et al, in U.S. Pat. No. 4,649,505, disclose a two-input adaptive noise canceller that also begins with a first signal (desired signal plus first noise signal) and a second (noise only) signal, where the two noise signals are highly correlated. As best illustrated in FIG. 2, the second signal is passed through a first adaptive filter to produce a first "noise only" signal that is subtracted from the first signal (desired signal plus first noise signal). This first difference signal is then passed through a second adaptive filter, the output thereof is subtracted from the second (noise only) signal, and this second difference signal is used to adjust the second adaptive filter to improve the apparatus output signal, which is the first difference signal. The inventors suggest that this approach is needed to remove any vestiges of the desired signal that may be present in the second (noise only) signal.

An adaptive radar signal processor that cancels a clutter or noise signal that is present is disclosed in U.S. Pat. No. 4,719,466, issued to Farina et al. The apparatus is applied to distinguish a desired echo radar signal from a clutter signal and from thermal noise (both Gaussian) that are part of the return signal. A matrix D representing a steady state estimate is constructed by statistical manipulations, and an invertible covariance matrix M is constructed by the relation $M^{-1}=D^T D^*$, where $D^T$ and $D^*$ are the transpose and complex conjugate of the matrix D. The initial signal uses time delay, multiplication and integration of various signal to determine a covariance matrix.

Yoshida discloses an adaptive jitter noise canceller in U.S. Pat. No. 4,792,964. An initial signal, containing the desired signal and superimposed jitter noise, is passed through a low pass filter, then sampled at a uniformly spaced sequence of times $\{t_0+n\Delta t_0\}$ (n=0, 1, 2, . . . ; N a positive integer), then passed through a sinusoidal accentuator. The output signal is passed through an interpolator that produces quasi-samples at a sequence of times $\{t_1+n\Delta t_1\}$, then passed through a second lowpass filter, then passed through a prediction filter to produce a filter output signal. This filter output signal is then subtracted from the initial signal to cancel the jitter noise.

U.S. Pat. No. 4,914,398, issued to Jove et al, disclose a system that suppresses additive signal disturbances in data channels that contain magneto-resistive transducers. The system passes an initial signal through a time delay and also passes the initial signal through positive and negative signal envelope detectors that are subtracted from each other to produce a second signal. This second signal is passed through a nonlinear adaptive filter to produce an estimate of the disturbance present. The adaptive filter output signal is subtracted from the time delayed initial signal to produce a difference signal that suppresses the additive disturbance.

An adaptive pre-transmission filter for a modem, computed from the observed noise spectrum of the transmission channel, is disclosed by Betts et al in U.S. Pat. No. 5,008,903. A noise spectrum analyzer positioned at the receiver end calculates the difference between the transmitted signal and the received signal, and this difference is discretely Fourier transformed to produce an estimated noise spectrum. This noise spectrum is then transmitted back to the transmitter on a secondary channel, and pre-transmit filter coefficients are determined and used to suppress the observed transmission channel noise.

In U.S. Pat. No. 5,018,088, Higbie discloses an adaptive, locally-optimum signal detector and processor for spread spectrum communications. Here, the noise strength is much greater than the initial strength of the desired signal. The amplitude probability distribution function (APDF) of the noise is determined approximately, using the APDF of the desired signal plus noise as an estimate. This APDF estimate is then manipulated mathematically to produce one or more spectra that represent the noise alone, and a signal with enhanced desired signal component is produced. This approach changes adaptively with change in the present noise statistics.

Widrow et al, in "Adaptive Noise Cancelling: Principles and Applications", I.E.E.E. Proc., vol. 63 (1975) pp. 1692–1716, disclose use of a first or primary signal containing desired signal plus noise $s(t)+n_1(t)$ and a second, noise-only signal $n_2(t)$, where the two noise signals have non-zero correlation with each other but have zero correlation with the desired signal. The second signal is passed through an adaptive filter whose output signal is subtracted from the first signal, and the output difference signal is used to adjust the adaptive filter to produce an output difference signal in which the first noise component $n_1(t)$ is cancelled as completely as possible, using a Least Mean Squares algorithm to maximize noise cancellation. The basic problem can be generalized somewhat by adding third and fourth noise components $n_3(t)$ and $n_4(t)$ to the first and second signals, where these third and fourth noise components are uncorrelated with all other signals. This basic approach, where $n_3(t)=n_4(t)=0$, is used in many of the patents discussed above and in the invention. This article also discusses possible approaches when the second signal has non-zero correlation with the desired signal, a problem also discussed in the Zinsser et al patent (4,649,505) above.

In "Adaptive Noise Canceling Applied to Sinusoidal Interferences", I.E.E.E. Trans. Acoustics, Speech and Signal Processing, vol. 25 (1977) pp. 484–491, Glover discloses a method for eliminating sinusoidal or other periodic interferences that distort a desired signal. The basic approach discussed by Widrow et al in the 1975 article, and the adaptive filter with feedback is approximated by a linear, time-invariant filter. The noise or interference is a sinusoidal term or sum of such terms, whose presence is suppressed by appropriate choices of complex weighting coefficients in a related filter function.

Zeidler et al disclose a method for "Adaptive Enhancement of Multiple Sinusoids in Uncorrelated Noise", I.E.E.E. Trans. Acoustics, Speech and Signal Processing, vol;. 26 (1978) pp. 240–254. Here, the noise is white noise and the desired signal is a finite sum of sinusoids with arbitrary frequencies. The method involves approximate inversion of certain scalar or matrix equations to determine certain weighting coefficients that define the desired signal.

Sambur, in "Adaptive Noise Canceling for Speech Signals", I.E.E.E. Trans. Acoustics, Speech and Signal Processing, vol. 26 (1978) pp. 419–423, discloses an adaptive filtering technique that cancels out the desired signal, leaving a pure noise signal that can, presumably, be subtracted from the original combined signal to provide the desired signal. The method uses a variant on the usual Least Mean Squares (LMS) approach discussed in the Widrow et al 1975 article.

Ferrara and Widrow, in "The Time Sequenced Adaptive Filter", I.E.E.E. Trans. Acoustics, Speech and Signal Processing, vol. 29 (1981) pp. 679–683, disclose an alternative to the LMS filter, using a time-sequenced filter and associated algorithm. The algorithm provides a different weight matrix or vector for each of a recurring sequence of error surfaces defined by a least mean square error computed in the basic approach.

What is needed is an adaptive signal processing method that, ideally at least, will result in cancellation of most or all impulse noise and that does not require technically complex processing of the input signal. Preferably, the method should accept and process an input signal in real time, with little or no delay in issuance of an output signal with most or all of the noise removed.

SUMMARY OF THE INVENTION

These needs are met by the invention, which provides several embodiments of method and apparatus for substantial reduction or complete removal of impulse noise. In one embodiment, the method invention uses three signal processing channels, one channel for the desired signal plus (impulsive) noise, $s(t)+n_3(t)$, a first (pilot) channel for representative noise, $n_1(t)$, and a second (pilot) channel for representative noise, $n_2(t)$. The first, second and third channel signals are formed by passing a single input signal containing the desired signal plus impulse noise through parallel first, second and third channel filters, respectively, that have adjacent but spaced apart and non-overlapping regions of not-substantially-zero amplitudes $H_1(f)$, $H_2(f)$ and $H_3(f)$, respectively, in Fourier transform or frequency space with corresponding "frequency support regions" FS1, FS2 and FS3 for the filter amplitudes. The desired or noise-free signal $s(t)$ has a Fourier transform $S(f)$ that is substantially non-zero only within the frequency support region for the filter function $H_3(f)$, and the frequency support regions for $H_1(f)$, $H_2(f)$ and $H_3(f)$ are typically separated by 50–2,000 Hz. Passage of additive white Gaussian noise through these filters produce three output signals, $y_{1G}(t)$, $y_{2G}(t)$ and $y_{3G}(t)$, that are uncorrelated in time t: the expectation of the product, $E\{y_{iG}(t)\ y_{kG}(t)\}$ with $i \neq k$ is zero.

However, passage of impulse noise, such as noise produced by lightning or another natural disturbance, through any two of the filters in parallel produces two output signals, $h_i(t)$ and $h_k(t)$, that are strongly correlated in time. The amplitudes of the two filter output signals $h_i(t)$ and $h_k(t)$ are proportional to the input signal amplitudes, and the phases of the two filter output signals $h_i(t)$ and $h_k(t)$ are proportional to the times of arrival of the impulse noise signal at the two filters.

In a generic embodiment, the input signal is received and processed by three parallel channels The third channel includes a first filter with frequency response $H_3(f)$ whose frequency support region contains the frequency support region for the desired noise-free signal $s(t)$. The first and second channels include first and second filters with respective frequency responses $H_1(f)$ and $H_2(f)$ whose frequency support regions are spaced apart from, do not overlap with, and flank (lie to the right and left, respectively, of) the frequency support region for the third filter. The centers of the first and second filter frequency support regions are spaced apart from the center of the third filter frequency support region by relatively small frequency differences $\delta\omega_1$ and $\delta\omega_2$, respectively, preferably of the order of 50–2,000 Hz.

More specifically, the input signal is passed through a bandpass filter and is split into three channels by three signal mixers operating at spaced apart frequencies $\omega_3+\delta\omega_1$, $\omega_3+\delta\omega_2$, and $\omega_3$, where $\omega_3$ is a central frequency for the desired or noise-free signal and $\delta\omega_i$ is a suitable frequency offset for channel i (i=1,2). Each processing channel includes multiplication of the input signal by a signal of the form $\exp\{-j(\omega^3+\delta\omega_1)t-j\theta_{LO})\}$, $\exp\{-j(\omega_3+\delta\omega_2)t-j\theta_{LO})\}$ or $\exp\{-j(\omega_3t-\theta_{LO})\}$ ($j^2=-1$), for image translation in the respective first, second and third channels, and passage of the resulting signals through an appropriate low pass filter, where $\delta\omega_i=(\omega_i-\omega_3)$ (i=1,2) and $\theta_{LO}$ is the phase angle of the mixer or local oscillator.

In a general implementation of this embodiment, the first, second and third channel output signals are formed, and a combination signal $N(t;\phi)=\exp(-j\phi)\{n_1(t)\ n_2(t)\}^{1/2}$ is formed and added to the output signal $s(t)+n_3(t)$ of the third channel. In this embodiment, the choice of a real phase angle $\phi$ ($0 \leq \phi < 2\pi$) is made based upon an algorithm incorporated in the circuit. In one version, the choice of $\phi$ is restricted to $\phi=0$ or $\pi$ is so that $\exp(-j\phi)=\pm 1$. In another version of this embodiment, $\Phi$ ranges over a discrete or continuous set of numbers drawn from the range $0 \leq \phi < 2\pi$.

In a second general implementation, the output signal is $s(t)+n_3(t)+M(t;\psi 1, \psi 2)$ is formed, with $M(t;\psi 1, \psi 2)=\{n_1(t) \exp(-j\psi_1)+n_2(t) \exp(-j\psi_2)\}/2$, and choices for values of the real phase angles $\psi i(0 \leq \psi i < 2\pi; i=1,2)$ are made, according to an algorithm, for a best possible estimation of the desired noise-free signal s(t). Other general combinations of the signals $n_1(t)$ and $n_2(t)$ can also be formed and used for the noise cancellation.

The phase angles $\psi_1$, $\psi_2$ and $\phi$ can be chosen using a general algorithm incorporated in the circuit, or these angles can be estimated from known behavior of the phase in the Fourier transform of a pure impulse signal. In the first situation, the phase angles are determined using feedback and an algorithm that provides a "best" estimation for the noise signal $n_3(t)$ according to a quantitative measure of estimation error. In the second situation, the phase angles are estimated from observations of the signals $n_1(t)$ and $n_2(t)$, and the choice of passband central frequencies for the signal channels that form $n_1(t)$ and $n_2(t)$ is flexible. No feedback is required in this second situation.

DESCRIPTION OF PREFERRED EMBODIMENTS OF THE INVENTION

Figure 1:
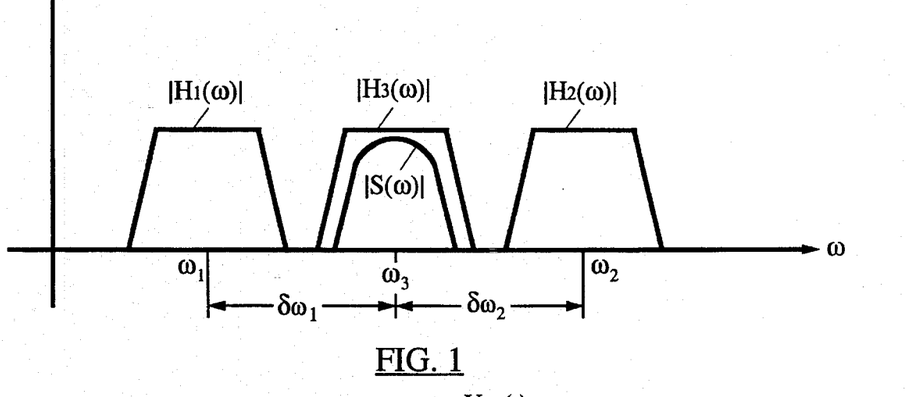
FIG. 1 is a graph of the frequency support functions for three filters, $H_1(\omega)$, $H_2(\omega)$ and $H_3(\omega)$, and for the desired noise-tree signal, S(f), used in several embodiments of the invention.

FIG. 1 schematically illustrates the frequency support regions $FS_1$, $FS_2$ and $FS_3$, centered at frequencies $\omega_1$, $\omega_2$, and $\omega_3$, for three filters, $H_1(\omega)$, $H_2(\omega)$ and $H_3(\omega)$, respectively, and for the desired noise-free signal, $S(\omega)$, used for the invention. As used herein, the term "frequency support region" for a function $F(\omega)$ that is not identically zero, refers to the smallest connected (one-piece) region on the real line in the frequency domain ($\omega$) for which $F(\omega)$ is substantially zero (or has very small magnitude) outside this region. The desired noise-free signal s(t) has a corresponding function $S(\omega)$ in the frequency domain, with frequency support region that is contained in the frequency support region for the third filter frequency response function $H_3(\omega)$. The frequency support regions for the frequency response functions $H_1(\omega)$ and $H_2(\omega)$ flank (lie on the left and right, respectively, of), do not overlap with, and are separated by distances of $\delta\omega_1$ and $\delta\omega_2$ from, the center ($\omega=\omega_3$) of the frequency support region for $H_3(\omega)$, as shown. The separation distances may each typically be of the order of 50–2,000 Hz. These separation distances may be positive or negative. Optionally, the circuit may delete the first filter ($H_1(\omega)$) or the second filter ($H_2(\omega)$), which contains noise only, in some embodiments of the invention.

Impulse noise is assumed to be represented by a time-shifted delta function $A\delta(t-\tau)$ in the input signal, or by a sum of such functions, where A and $\tau$ are parameters determined by the environment. It is further assumed that the output signal phase for any filter that receives the circuit input signal is linearly proportional to the frequency, or collection of frequencies, that make up the input signal; this assumption need only be satisfied in neighborhoods of the frequencies $\omega_1$, $\omega_2$ and $\omega_3$.

Figure 2A:
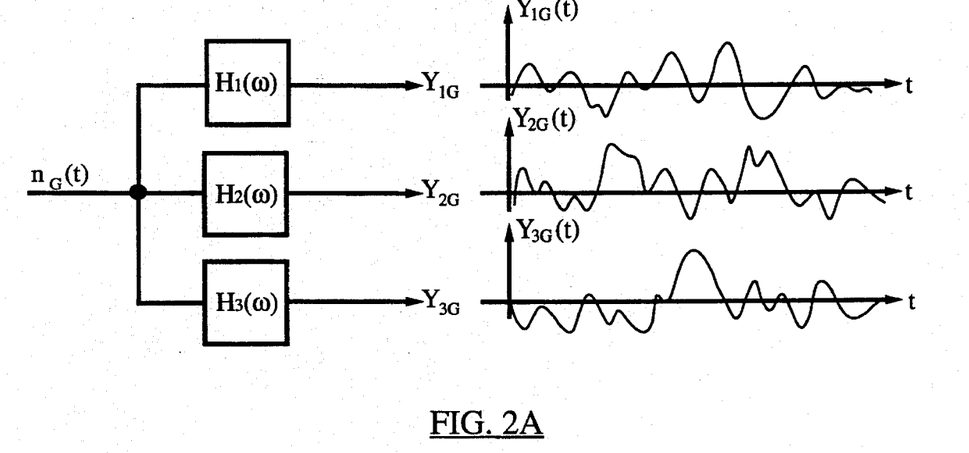
FIGS. 2A and 2B are graphs of filter output signals $y_1(t)$, $y_2(t)$ and $y_3(t)$ for respective input signals representing a Gaussian noise signal and an impulse noise signal.

FIG. 2A illustrates the effect of passing a Gaussian noise signal $n_G(t)$ through the filters of channels 1, 2 and 3. This produces output signals $y_{1G}(t)$, $y_{2G}(t)$, $y_{3G}(t)$ with substantially zero correlation in time: the expectation $E\{y_{iG}(t) y_{kG}(t)\}$ is zero for $i \neq k$.

Figure 2B:
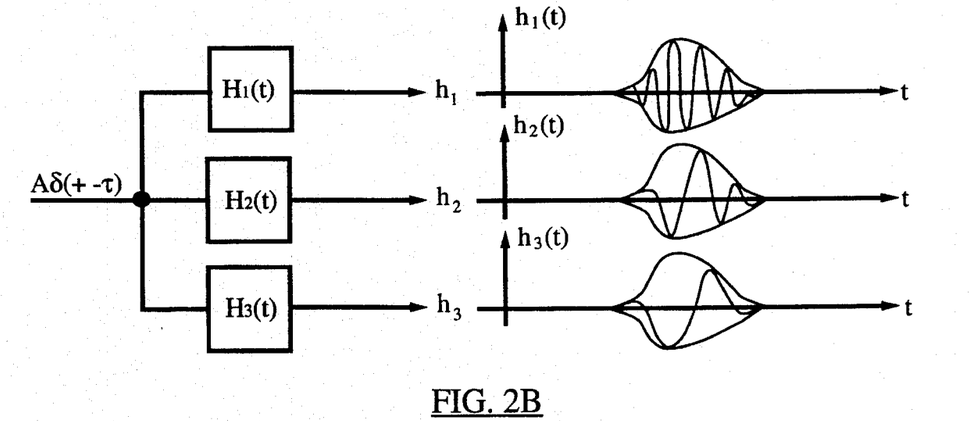

FIG. 2B illustrates the effect of passing an impulse noise signal, represented by a time-shifted delta function with amplitude A, $A\delta(t-\tau)$, through the filters of channels 1, 2 and 3. This produces the respective impulse response functions $Ah_1(t-\tau)$, $Ah_2(t-\tau)$ and $Ah_3(t-\tau)$, and any two of these three response functions are qualitatively similar and are highly correlated. Thus, knowledge of one or more of the functions $Ah_1(t-\tau)$ and $Ah_2(t-\tau)$ allows one to predict the shape and amplitude of the impulse function $Ah_3(t-\tau)$ with reasonable accuracy and to remove or cancel the impulse noise contribution from the third channel output waveform $s(t)+n_3(t)=s(t)+Ah_3(t-\tau)$.

Figure 3:
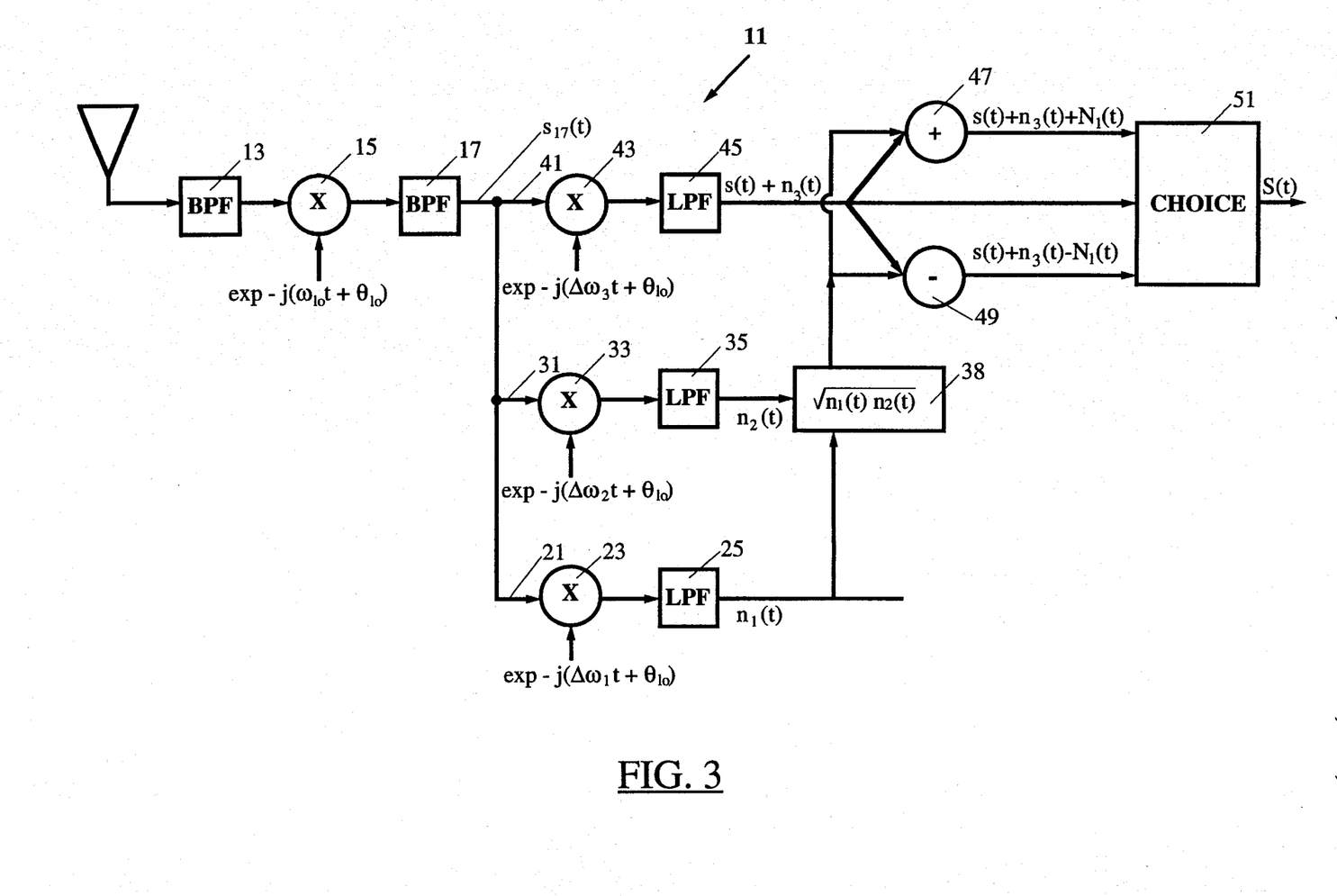
FIGS. 3, 5, 6, 7 and 9 are schematic views of several embodiments of the invention.

FIG. 3 is a schematic view illustrating a first embodiment 11 of apparatus constructed according to the invention. The apparatus receives the sum of a desired noise-free signal s(t) plus an impulse noise signal n(t), where the impulse noise signal can be represented by a time-shifted delta function with amplitude A, $A\delta(t-\tau)$, namely where the amplitude A and time shift $\tau$ are characteristic of that impulse noise source. Alternatively, the impulse noise may be represented by a sum of such time-shifted delta functions, each delta function having its own amplitude and time shift parameters. The input signal $s(t)+n(t)$ is received by a band pass filter (BPF) 13 that limits the contribution to a band of frequencies including the frequency support regions $FS_1$, $FS_2$ and $FS_3$, illustrated in FIG. 1. The output waveform of the band pass filter 13 is received by a mixer 15 that multiplies this output signal by the function $\exp\{-j(\omega_{LO}t+\theta_{LO})\}$, where $\omega_{LO}$ and $\theta_{LO}$ are the frequency and phase angle of the local oscillator, then by an intermediate frequency band pass filter 17 with selected frequency bandpass that includes the frequency support regions $FS_1$, $FS_2$ and $FS_3$. The BPF 13 and/or the mixer 15 are characteristic of a double frequency conversion receiver, are optional, and may be deleted here.

The output signal $s_{17}(t)$ from the BPF 17 is received by three signal processing channels 21, 31 and 41. In the first channel 21, the output signal $s_{17}(t)$ is received by a local oscillator 23 that multiplies its input signal by $\exp\{-j(\Delta\omega_1 t+\theta_{LO})\}$, then passed through an LPF 25 with a roll-off frequency $\omega_{u1}$. In the second channel 31, the output signal $s_{17}(t)$ is received by a local oscillator 33 that multiplies its input signal by $\exp\{j(-\Delta\omega_2 t+\theta_{LO})\}$, then passed through an LPF 35 with a roll-off frequency $\omega_{u2}$ (which is usually identical to $\omega_{u1}$). In the third channel 41, the output signal $s_{17}(t)$ is received by a local oscillator 43 that multiplies its input signal by $\exp\{-j(\Delta\omega_3 t+\theta_{LO})\}$, then passed through an LPF 45 with a roll-off frequency $\omega_{u3}$. (which is usually identical to $\omega_{u1}$) If a double frequency conversion receiver is used, the parameters $\Delta\omega_1$, $\Delta\omega_2$ and $\Delta\omega_3$ are defined by the relations $$\Delta\omega_1 \approx \omega_1 - \omega_{LO}, \qquad (1)$$

$$\Delta\omega_2 \approx \omega_2 - \omega_{LO}, \qquad (2)$$

$$\Delta\omega_3 \approx \omega_3 - \omega_{LO}. \qquad (3)$$

If a single frequency conversion receiver is used, the frequency $\omega_{LO}$ is deleted in Eqs. (1), (2) and (3). The parameters $\omega_{LO}$, $\theta_{LO}$, and $\omega_{u1}$ may be selected according to other criteria.

Output signals $n_1(t)$ and $n_2(t)$ from the two channels 21 and 31 are received by a square root/multiplier module 38 that issues the (complex) square root/product or geometric mean output function:

$$N_1(t)=\{n_1(t) n_2(t)\}^{1/2}. \qquad (4)$$

Figure 4:
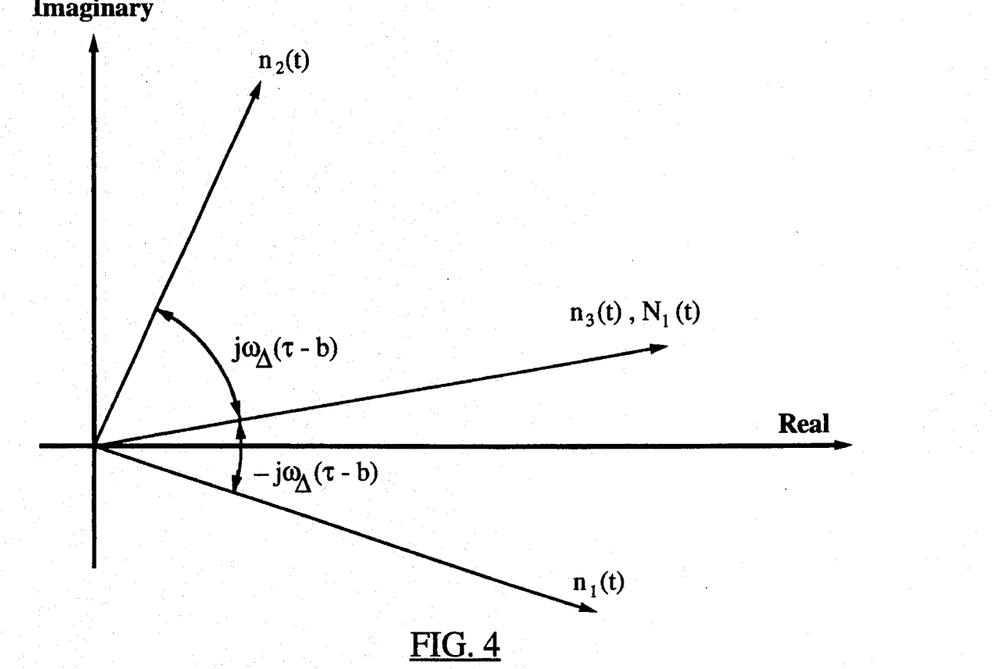
FIGS. 4 and 8 are graphs in the complex plane illustrating use of particular combinations of the channel signals that are used in the embodiments of FIGS. 3, 5, 6, 7 and 9.

The output signal $N_1(t)$ is received by one input terminal of a sum module 47 and by one input terminal of a difference module 49. A second input terminal of the sum module 47 and of the difference module 49 receives the output signal $s(t)+n_3(t)$ from the third channel 41. The sum module 47 and the difference module 49 produce and issue the output signals $s_+(t)=s(t)+n_3(t)+N_1(t)$, $s(t)+n_3(t)$ and $s_-(t)=s(t)+n_3(t)-N_1(t)$, respectively. The three output signals $s_+(t)$, $s(t)+n_3(t)$ and $s_-(t)$ are received by a choice module 51 that determines which of these three output signals provides a better representation of the desired noise-free signal $s(t)$, using an algorithm that examines the output signals $s_+(t)$, $s(t)+n_3(t)$ and $s_-(t)$ and makes this determination. The apparatus 11 then issues an output signal:

$$S_1(t)=s_+(t) \text{ or } s(t)+n_3(t) \text{ or } s_-(t), \qquad (5)$$

illustrating formation of the signal $N_1(t)$ in the square root/multiplier module 39 and estimation of the noise component $n_3(t)$.

Figure 5:
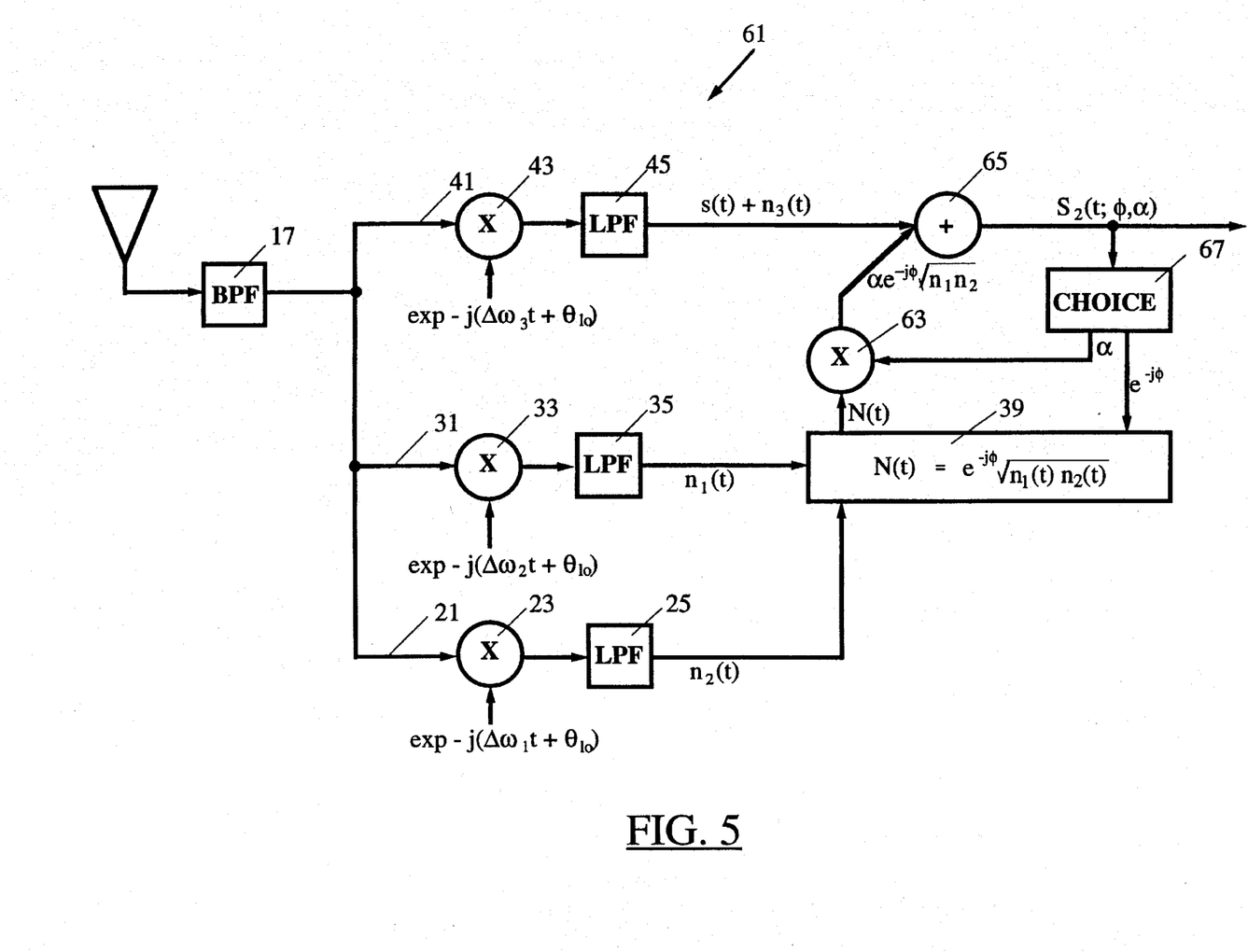

In a second embodiment 61 of the invention, illustrated in FIG. 5, an input signal $s(t)+n(t)$ again is received by the band pass filter 17, which issues an output signal $s_{17}(t)$. Again, the BPF 13 and mixer 15 shown in FIG. 3 are optional here. The BPF output signal $s_{17}(t)$ is received by the three signal processing channels 21, 31 and 41, as in FIG. 3, and the three channel output signals $n_1(t)$, $n_2(t)$ and $s(t)+n_3(t)$ are produced as in FIG. 3. The channel output signals $n_1(t)$ and $n_2(t)$ are received at two input terminals of a complex square root/multiplier module 39, which produces and issues a complex square root/product output signal:

$$N(t;\phi)=\exp(-j\phi) N_1(t)=\exp(-j\phi) \{n_1(t)n_2(t)\}^{1/2}, \qquad (6)$$

where $\phi$ is a real number in the range $0 \leq \phi < 2\pi$. This output signal is multiplied by a real number $\alpha$ at a product module 63, then received at one input terminal of a sum module 65 that receives the third channel output signal $s(t)+n_3(t)$ at its second input terminal. The sum module output signal:

$$S_2(t;\phi,\alpha)=s(t)+n_3(t)+\alpha N(t;\phi) = s(t)+n_3(t)+\alpha \exp(-j\phi) \{n_1(t)n_2(t)\} \quad (7)$$

is then received by a choice module 67 that adjusts the real numbers $\phi$ and $\alpha$ by feedback to the second input terminal of the module 63, to obtain the best possible representation for the desired noise-free signal $s(t)$ by the output signal $S_2(t;\phi,\alpha)$. The choices $(\alpha=1, \phi=0)$, $(\alpha=1, \phi=\pi)$ and $(\alpha=0)$ produce the candidate signals $s(t)+n_3(t)\pm\{n_1(t)n_2(t)\}^{1/2}$ and $s(t)+n_3(t)$ used in FIG. 3. The phase angle $\phi$ can be drawn from a discrete, partly continuous or wholly continuous subset of the interval $0 \leq \phi < 2\pi$.

Figure 6:
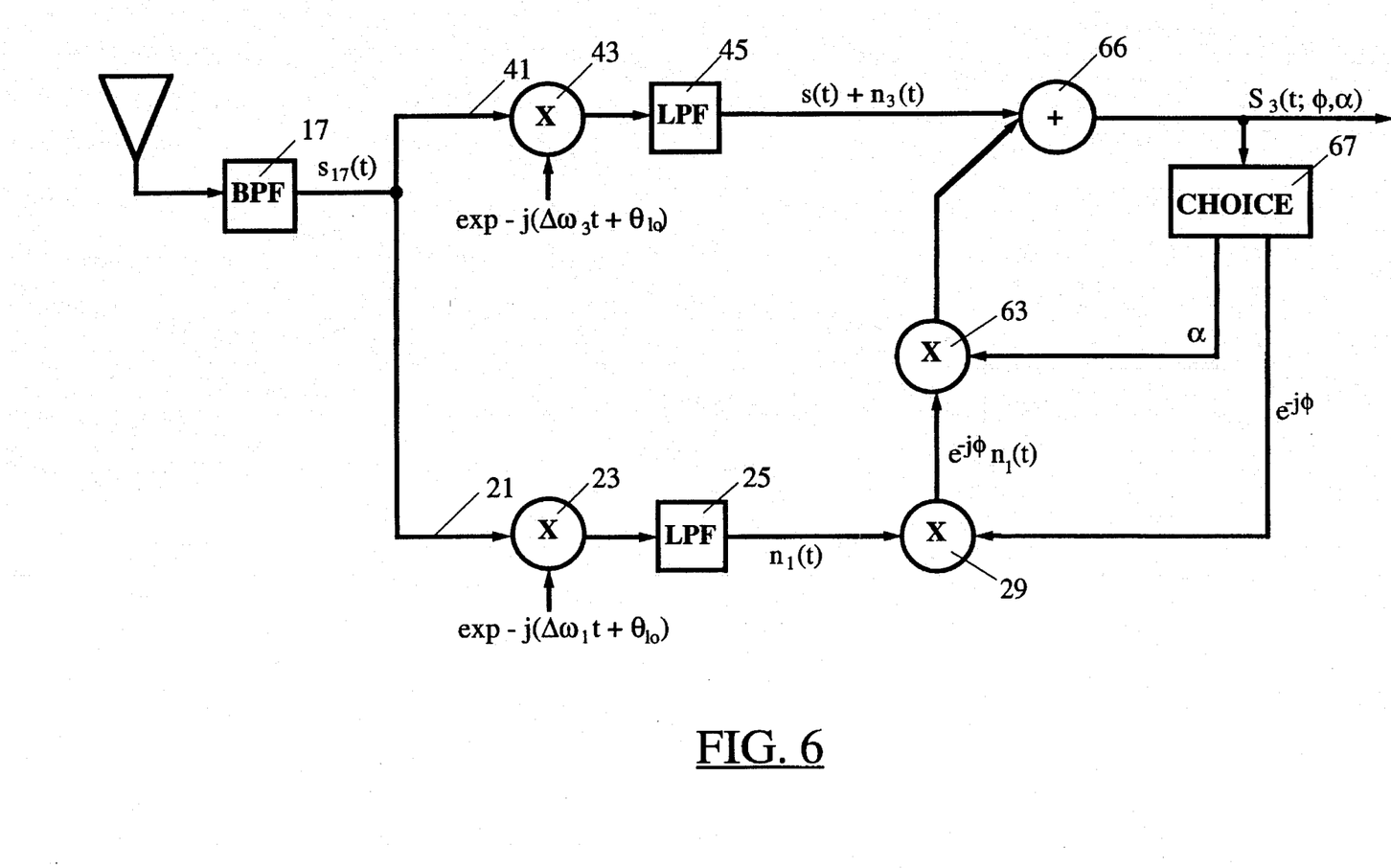

In a third embodiment of the invention, illustrated in FIG. 6, one of the two channels 21 or 31 is deleted, product modules 29 and 63 form and issue an output signal $\alpha \exp(-j\phi) n_i(t)$, and a sum module 66 issues an output signal:

$$S_3(t;\phi,\alpha)=s(t)+n_3(t)+\alpha \exp(-j\phi) n_i(t) \quad (i=1 \text{ or } 2) \qquad (8)$$

that is received by a choice module 69, which adjusts the phase $\phi$ and multiplier $\alpha$ to obtain the best possible representation for the desired noise-free signal $s(t)$ by the output signal $S_3(t;\phi,\alpha)$.

Figure 7:
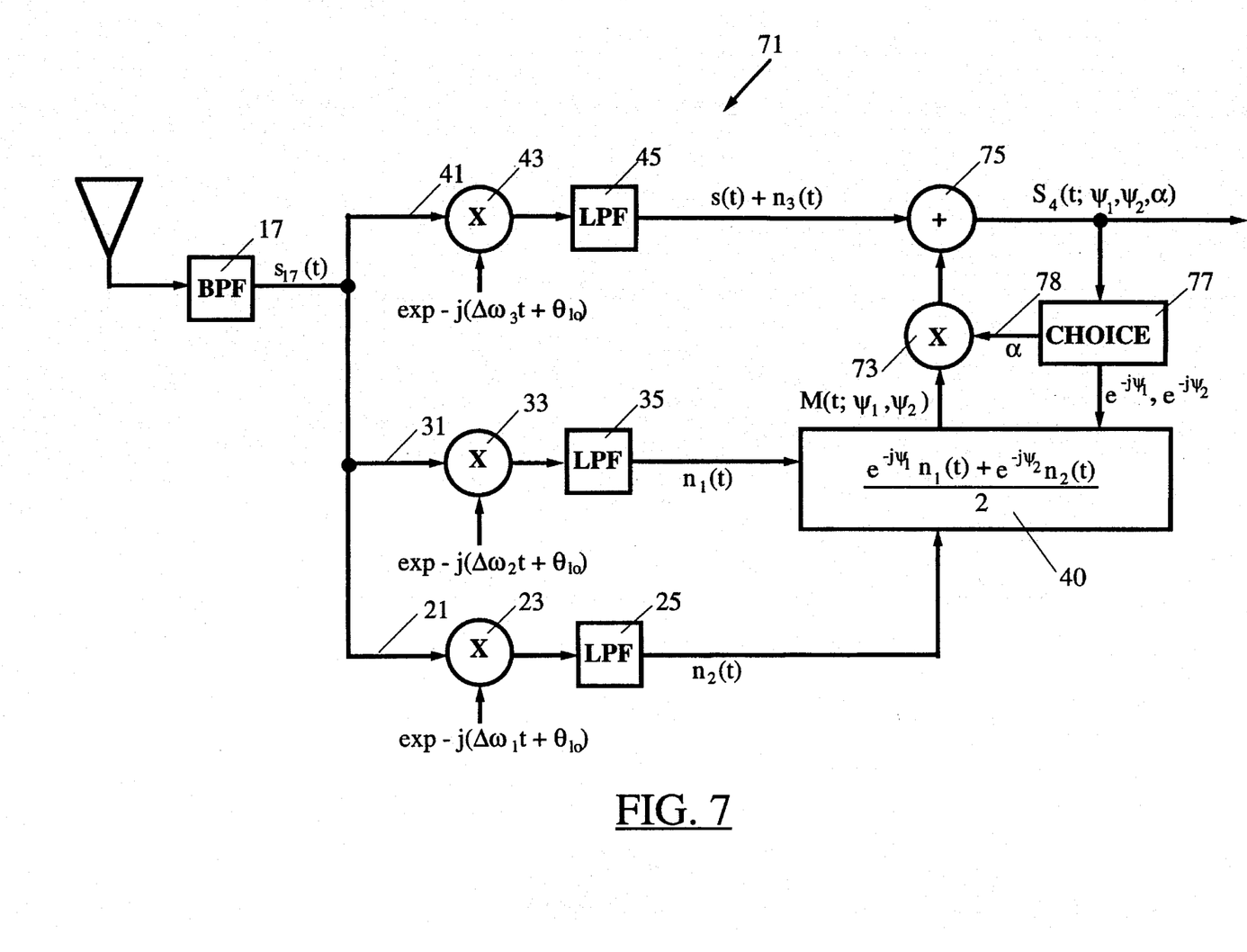

In a fourth embodiment 71 of the invention, illustrated in FIG. 7, an input signal $s(t)+n(t)$ again is received by the BPF 17, which issues an output signal $s_{17}(t)=s(t)+n_3(t)$. The BPF output signal $s_{17}(t)$ is received and processed by the three signal processing channels 21, 31 and 41, as in FIG. 3, and the three channel output signals $n_1(t)$, $n_2(t)$ and $s(t)+n_3(t)$ are produced as in FIG. 3. The channel output signals $n_1(t)$ and $n_2(t)$ are received at two input terminals of a complex arithmetic mean module 40, which produces and issues the (complex) arithmetic mean output function:

$$M(t;\psi 1,\psi 2)=\{n_1(t) \exp(-j\psi 1)+n_2(t) \exp(-j\psi 2)\}/2, \qquad (9)$$

where $\psi 1$ and $\psi 2$ are real numbers in the range $0 \leq \psi i < 2\pi (i=1,2)$.

Figure 8:
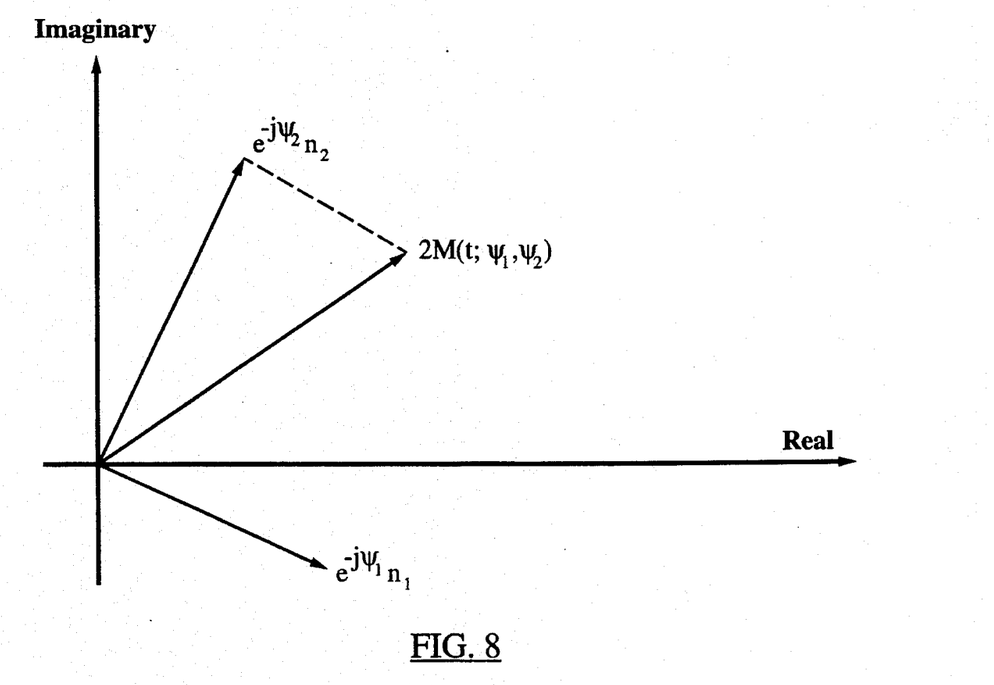

FIG. 8 is a graph of the real and imaginary parts of the signals $n_1(t)$, $n_2(t)$ and $n_3(t)$, illustrating formation of the signal $M(t;\psi 1,\psi 2)$ in the complex arithmetic mean module 40.

The output function $M(t;\psi 1,\psi 2)$ in FIG. 7 is received by one input terminal of a product module 73 that forms and issues an output signal $\alpha M(t;\psi 1,\psi 2)$, where the real numbers $\alpha$ and $\psi i$ ($0 \leq \psi i < 2\pi$; $i=1$ or 2) are determined by a choice module 77. A convenient choice here is $\alpha=1$. The output signal of the product module 73 is received at one input terminal of a sum module 75 that receives the third channel output signal $s(t)+n_3(t)$ at its second input terminal. The sum module output signal:

$$S_4(t;\psi 1,\psi 2,\alpha)=s(t)+n_3(t)+\alpha M(t;\psi 1,\psi 2) \quad (10)$$

is then received by the choice module 77 that adjusts the real numbers $\psi 1$ and $\psi 2$ by feedback to the arithmetic mean module 40, to obtain the best possible representation for the desired noise-free signal $s(t)$ by the output signal $S_4(t;\psi 1,\psi 2,\alpha)$.

A fifth embodiment is obtained in FIG. 7 by setting the phase angles $\psi 1=\psi 2=\psi$ and producing a sum module output signal:

$$S_5(t;\psi,\alpha)=s(t)+n_3(t)+\alpha M(t;\psi,\psi), \quad (11)$$

which is then optimized by appropriate choices of two parameters, $\psi$ and $\alpha$. Normally, at most two of the three parameters $\psi 1$, $\psi 2$ and $\alpha$ are varied so that either $\alpha=1$ and/or $\psi 1=\psi 2=\psi$ in Eq. (10).

The phase angles $\psi i$ ($i=1,2$) or $\psi$ used in the output signal $M(t;\psi 1,\psi 2)$ are produced by the choice module 77 and introduced by feedback on an output line 78 to the product module 73. The phase angles $\psi i$ can be determined by a sequential search procedure that optimizes the apparatus output signal from the sum module 75 with respect to the choice of phase angles $\psi i$. In the second, third, fourth and fifth embodiments, the multiplier $\alpha$ and/or one or more phase angles ($\phi$, $\psi 1$, $\psi 2$ or $\psi$ can be prescribed (for example, $\alpha=1$ in Eqs. (7), (8) or (11)) rather than being determined by signal optimization.

Figure 9:
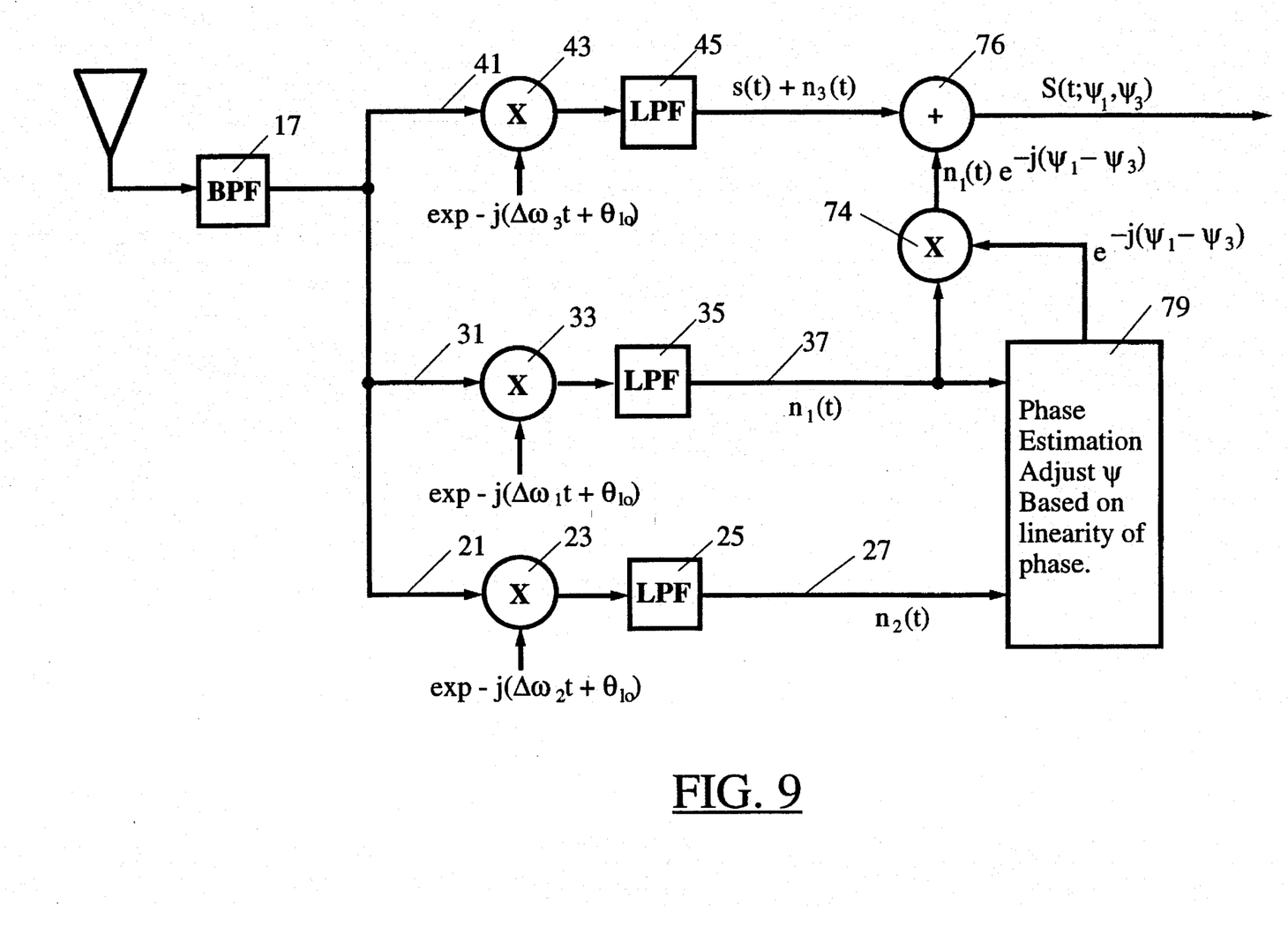

Alternatively, the phase angles $\psi i$ and $\phi$ in FIGS. 5, 6 and 7 can be estimated by making use of a property of the phase $\Psi$ of the Fourier transform of an impulse function $A\delta(t-\pi)$. The phase $\Psi$ increases linearly with the frequency $\omega$ in the Fourier transform domain; that is, $$\Psi(\omega)=a+b\omega, \quad (12)$$

where a and b are constants. In this alternative, shown in FIG. 9, the output signals $n_1(t)$ and $n_2(t)$ of the respective first and second channels are carried by respective signal lines 27 and 37 to a phase estimation module 79 that produces phases $\Psi 1$ and $\Psi 2$ defined by the relations $$\Psi 1=a+b\omega_1, \quad (13)$$

$$\Psi 2=a+b\omega_2, \quad (14)$$

where $\Psi 1$ and $\Psi 2$ are assumed to be measured by the phase estimation module 79. The coefficients a and b in Eqs. (13) and (14) are then determined by the relations $$a=\{(\Psi_1)(\omega_2)-(\Psi_2)(\omega_1)\}/((\omega_2-\omega_1)) \quad (15a)$$

$$b=(\Psi 2-\Psi 1)/(\omega_2-\omega_1), \quad (15b)$$

and the phase associated with the noise portion of the signal $s(t)+n_3(t)$ in the third channel 41 is estimated as $$\Psi 3=a+b\omega_3. \quad (16)$$

If only the difference of two phase angles is sought, the coefficient a in Eq. (15a) is not used. A product module 74 receives the input signals $n_1(t)$ and $\Psi 1-\Psi 3$ and produces and issues an output signal $\exp[-j(\Psi 1-\Psi 3)]n_1(t)$ that is subtracted from the signal $s(t)+n_3(t)$ by a difference module 76 to produce an estimate $$S_3'(t;\Psi 1,\Psi 3,\alpha=1)=s(t)+n_3(t)-\exp\{-j(\Psi 1-\Psi 3)\}n_1(t). \quad (17)$$

This alternative approach for determination of the phase $\Psi$ can also be used to determine the phase angle $\phi$ in FIG. 5. The phase angle $\phi$ in Eq. (7) is chosen as $$\phi=\Psi 3-(\Psi 1+\Psi 2)/2, \quad (18)$$

and this choice produces an estimate signal $S_2'(t;\phi,\alpha)$. The phase angles $\psi 1$ and $\psi 2$ in Eq. (9) are chosen to be $$\psi i=\Psi i-\Psi 3 \ (i=1,2), \quad (19)$$

and these choices produce an estimate signal $S_4'(t;\psi 1,\psi 2,\alpha)$.

The output signals $n_1(t)$ and/or $n_2(t)$ from the first and/or second channels in FIG. 5 can be replaced by output signals $n_4(t)$ and/or $n_5(t)$ from one or two new channels, constructed as the first and second channels are but with different selected central frequencies $\omega_4$ and/or $\omega_5$ and measured phases $\Psi 4$ and/or $\Psi 5$ replacing the frequency and phase angle parameters used in Eqs. (15a) and (15b). However, it is usually more convenient to use the channel signals $n_1(t)$ and $n_2(t)$ for this purpose.

In FIG. 1, the center frequencies $\omega_1$ and $\omega_2$ are shown flanking the center frequency $\omega_3$ on the left and right. If the phase angle $\phi$ or $\psi 1$ or $\psi 2$ or $\psi$ is determined by the algorithm discussed in connection with Eqs. (15a) and (15b), the center frequencies $\omega_1$, $\omega_2$ and $\omega_3$ may be chosen anywhere on the positive real axis, provided that $\delta\omega_1$ and $\delta\omega_2$ are not so large that phase linearity is lost. For example, one might choose $\omega_1<\omega_2<\omega_3$ or $\omega_3<\omega_1<\omega_2$ using this algorithm.

The functions $N(t;\phi)$ (complex geometric mean) and $M(t;\psi 1,\psi 2)$ (complex arithmetic mean) set forth in Eqs. (6) and (9) are particular examples of a two-place, symmetric, homogeneous function of the variables $p_1$ and $p_2$ of degree one with two associated adjustable parameters $\theta 1$ and $\theta 2$ (which may be identical), denoted $HS(p_1,p_2;\theta 1,\theta 2)$, that satisfies the following conditions.

$$HS(p_1,p_2;\theta 1,\theta 2)=HS(p_2,p_1;\theta 2,\theta 1), \text{ (symmetry)}, \quad (20)$$

$$HS(kp_1,kp_2;\theta 1,\theta 2)=k \ HS(p_1,p_2;\theta 1,\theta 2), (k\neq 0) \text{ (homogeneity of degree one)}. \quad (21)$$

Another example of such a function is the function $$HS(p_1,p_2;\theta 1,\theta 2)=\{A(\theta 1 p_1)^h+B(\theta 2 p_2)^h\}^{1/h}\exp\{C(\theta 2 p_2/\theta 1 p_1)\}(h \text{ real and }\neq 0), \quad (22)$$

where A, B and C are arbitrary constants. More generally, any two-place symmetric, homogeneous function of degree one $HS\{n_1(t), n_2(t); \theta 1,\theta 2\}$ with two adjustable parameters $\theta 1$ and $\theta 2$ (which may be identical) can be formed from the output noise signals from channels 21 and 31, and a general linear combination LC of the two signals $s(t)+n_3(t)$ and $HS\{n_1(t), n_2(t); \theta 1,\theta 2\}$ can be received at the input terminal of the choice or estimation module 51, 67, 77 or 79 in FIGS. 3, 5, 7 or 9, respectively.

Figure 10A:
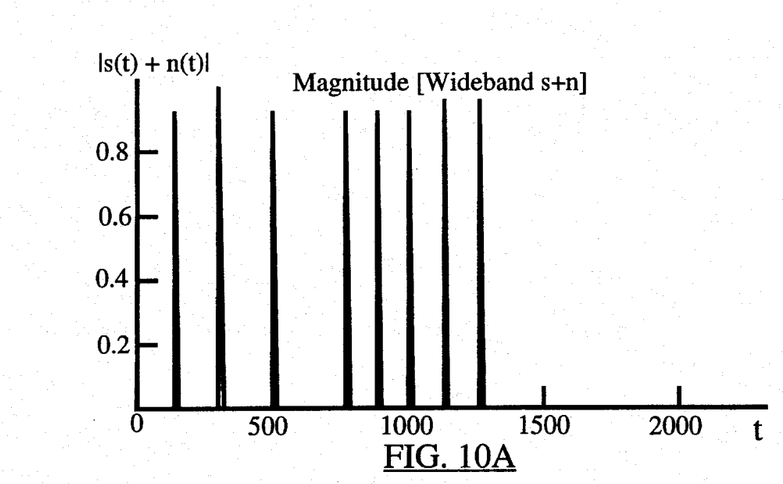
FIGS. 10A, 10B, 10C, 10D, 10E and 10F are graphs of the magnitudes of the signals s(t)+n(t) (wideband, before passage through a low pass filter), s(t) (narrowband, after passage through a low pass filter), $s(t)+n_3(t)$ (narrowband), $s(t)+n_3(t)+N(t;\phi=0)$, $s(t)+n_3(t)-N(t;\phi=0)$ and $s(t)+n_3(t)\pm N(t;\phi=0)$ (optimized), respectively, produced in the embodiment of FIG. 3 and used in the choice module in FIG. 3, where $N(t;\phi)=\exp(-j\phi)\ \{n_1(t)\ n_2(t)\}^{1/2}$ is a particular combination of two noise channel signals discussed below, using displacement from the signal median as a quantitative measure of error.
Figure 10B:
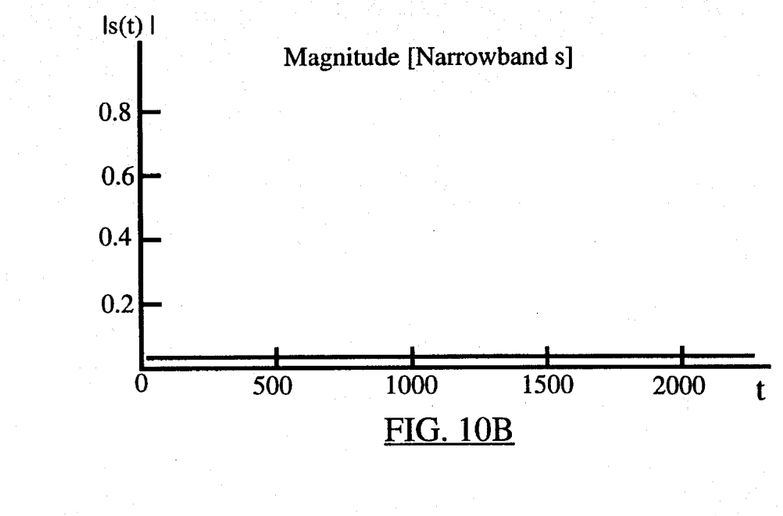
Figure 10C:
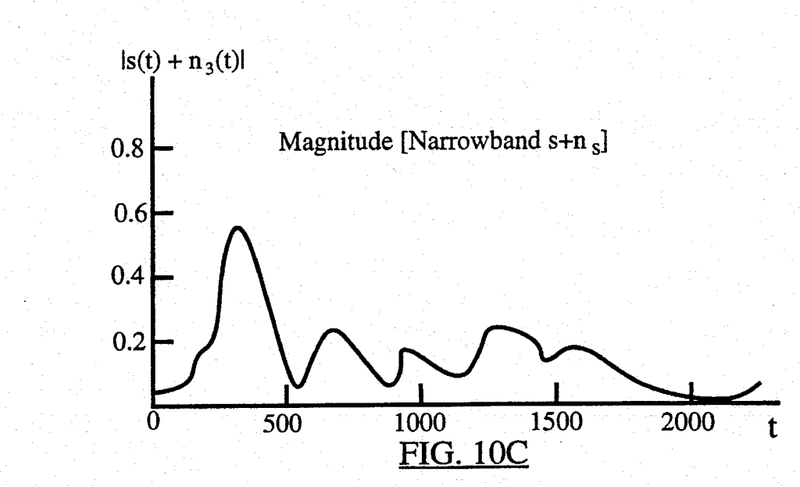

One alternative for the choice algorithm incorporated in the choice or estimation module of FIGS. 3, 5, 6, 7 and 9 is illustrated by a wideband input test signal $s(t)+n(t)$, whose magnitude is shown in FIG. 10A. The test signal consists of a constant function $s(t)=\text{constant}$, upon which are imposed six noise spikes, each of normalized height=1, as shown. The magnitudes of the five signals $s(t)$ (narrowband, after passage through a lowpass filter), $s(t)+n_3(t)$ (narrowband), $s_+(t)=s(t)+n_3(t)+N_1(t)$, $s_-(t)=s(t)+n_3(t)-N_1(t)$ and the optimum choice $S_1(t)$ are formed and shown graphically in FIGS. 10B, 10C, 10D, 10E and 10F, respectively. The phase of the wideband input test signal $s(t)+n(t)$ is shown in FIG. 11A. The phases of the five signals $s(t)$ (narrowband), s(t)+n₃(t) (narrowband), s₊(t)=s(t)+n₃(t)+N₁(t), s₋(t)=s(t)+n₃(t)−N₁(t) and the optimum choice $S_1(t)$ are shown graphically in FIGS. 11B, 11C, 11D, 11E and 11F, respectively.

Figure 10D:
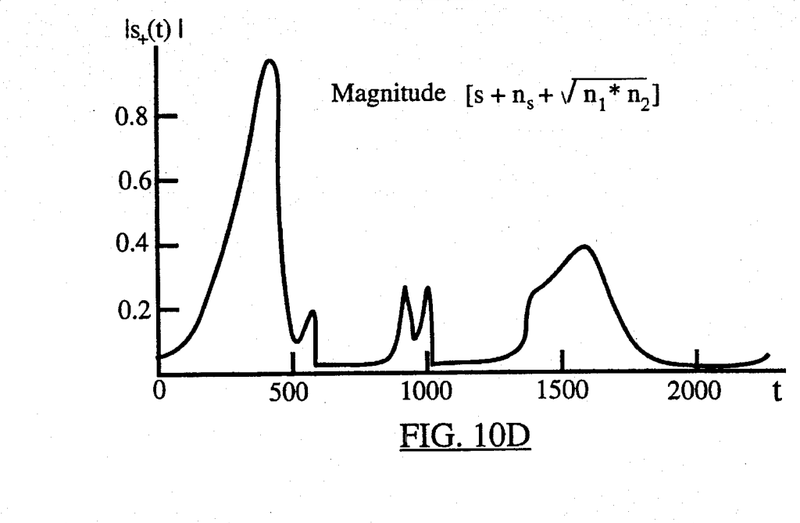
Figure 10E:
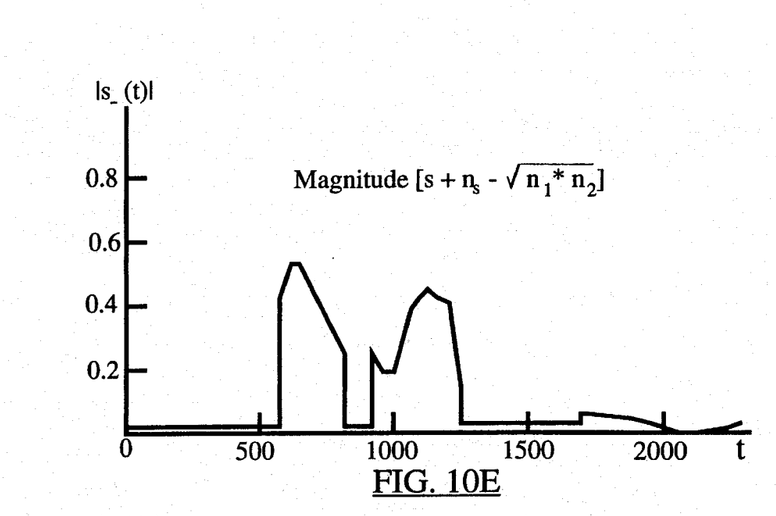
Figure 11A:
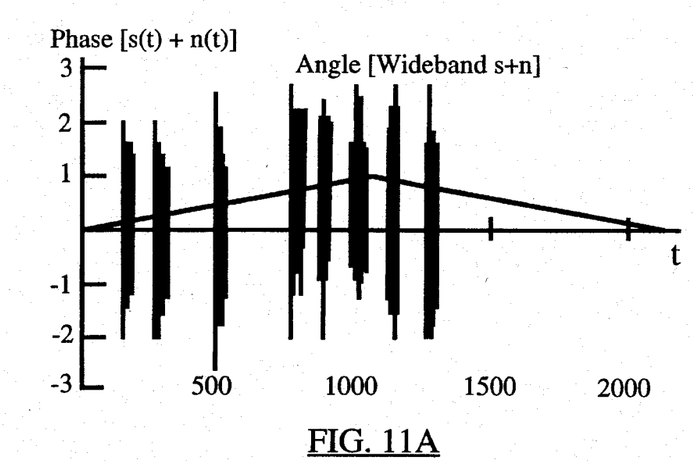
FIGS. 11A, 11B, 11C, 11D, 11E and 11F are graphs of the phase angles for the signals s(t)+n(t) (wideband), s(t) (narrowband), $s(t)+n_3(t)$ (narrowband), $s(t)+n_3(t)+N(t;\phi=0)$, $s(t)+n_3(t)-N(t;\phi=0)$, and $s(t)\pm n_3(t)\pm N(t;\phi=0)$ (optimized), respectively, produced in the embodiment of FIG. 3 and used in the choice module in FIG. 3, using the error measure used in FIGS. 10A–10F.
Figure 11B:
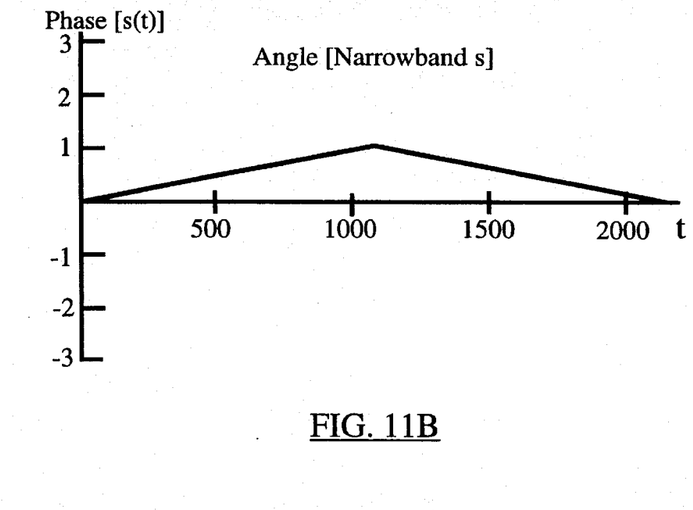
Figure 11C:
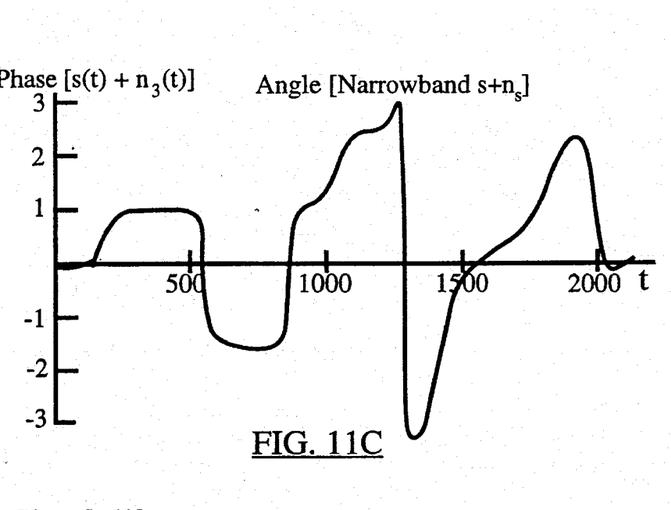
Figure 11D:
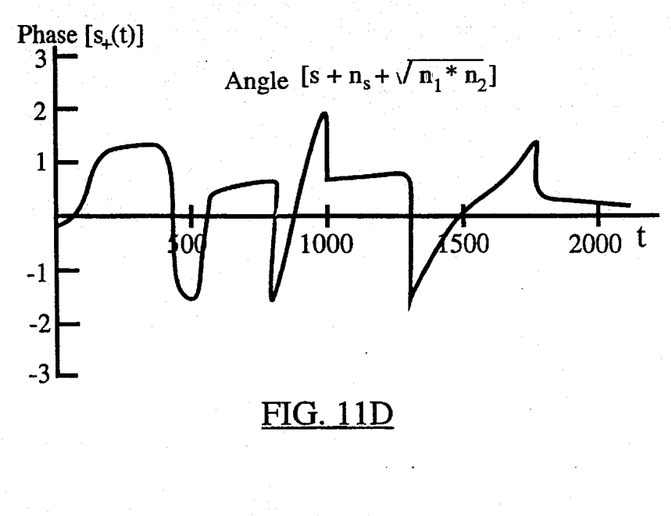
Figure 11E:
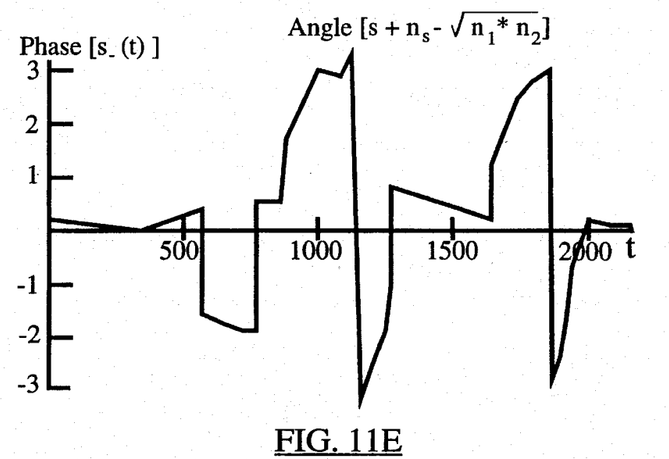

With reference to FIGS. 10D and 10E, note that the magnitude |s₊(t)|=|s(t)+n₃(t)+N₁(t)| produces the most-nearly-constant output signal magnitude for the approximate time ranges 600 Δt≦t≦800 Δt and 900 Δt≦t≦1250 Δt and 1600 Δt≦t≦2000 Δt; and the magnitude |s₋(t) |=|s(t)+ n₃(t)−N(t)| produces the most-nearly-constant output signal magnitude for the approximate time ranges 0<t≦600 Δt and 800 Δt<t<900 Δt and 1250 Δt≦t≦1600 Δt. The phases of the signals s₊(t) and s₋(t) manifest similar behavior in FIGS. 11D and 11E. Because of this behavior, the optimum choice of output signal, s₊(t) or s₋(t) or s(t)+n₃(t), will change from time to time in the sampling interval. Often the signal whose magnitude (or phase) is closest to the signal median is determined to be the chosen signal.

This change with time of choice of the optimized output signal, s₊(t) or s₋(t) or s(t)+n₃(t), is believed to extend to a change with time of choice of the real numbers α, φ, ψ1 ψ2 and/or ψ in the output function in Eqs. (6), (9))and (10), in order to produce an improved output function. The preceding approach can also be applied to the functions r(t)=S₁(t), S₂(t;φ,α), S₃(t;φ,α)), S₄(t;ψ1,ψ2,α), or S₅(t;ψ,α) set forth in Eqs. (5), (7), (8), (10) or (11).

Figure 10F:
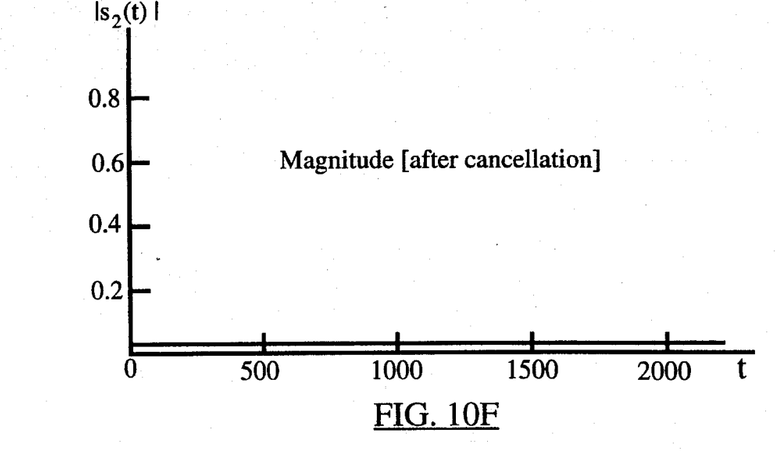
Figure 11F:
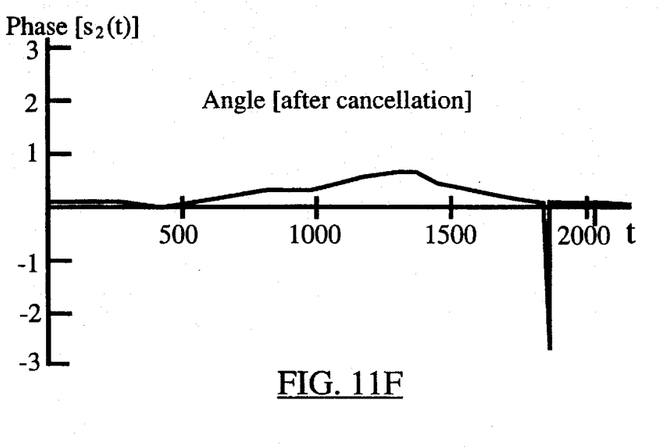

The quantitative error measure used to produce the optimized signal S₂(t), whose magnitude and phase are shown in FIGS. 10F and 11F, respectively, is the displacement from the signal median (magnitude or phase), denoted $r_{med}$, of samples of the resulting signal. If $\{r(t_i)\}_i$ denotes a set of P+1 sampled values of a signal r(t) at a set of consecutive sample times $t_0 < t_1 < \ldots < t_P$, the sampled values are rearranged, by sorting or another appropriate permutation operation Φ, into a monotonic set $\{r(t_{\Phi i})\}_i$ for which $r(t_{\Phi i}) \leq r(t_{\Phi k})$ whenever 1≦i<k≦P. The median value of the sampled signal r(t) is determined by the relations $$\text{Med}\{r(t); t1,t2\} = r_{med}, \quad (23)$$
$$= r(t_{\Phi i}) \ (i = P/2, \text{ if } P \text{ is even})$$
$$= r(t_{\Phi i}) \ (i = (P-1)/2 \text{ or }$$
$$i = (P+1)/2, \text{ if } P \text{ is odd}).$$

With this choice of quantitative error measure, the choice of s₊(t) or s₋(t) is made for a particular time interval {t1, t2}, based upon which choice produces the instantaneous signal value (magnitude or phase) that is closest to the median value of the input signal s(t)+n₃(t) over the designated time interval. The median algorithm can be applied to the output functions r(t)=S₁(t), S₂(t;φ,α), S₃(t;φ,α), S₄(t;ψ1,ψ2,α) or S₅(t;ψ,α) set forth in Eqs. (5), (7), (8), (10) or (11).

Another suitable error measure and associated algorithm, cumulative variation of the signal r(t), is determined by forming the sum $$\text{Var}\{r(t); t_0, t_P\} = \sum_{p=0}^{P-1} |r(t_{i+1}) - r(t_i)|, \quad (24)$$

where r(t) represents the signal |S₂(t)|=|s₊(t)| or |s₋(t)| or |s(t)+n₃(t)| and P+1 is the number of distinct time points at which the signal r(t) is sampled in the interval $\{t_0, t_P\}$. The signal r(t) that produces the smallest value Var{r(t); $t_0, t_P$} is the most-nearly-constant signal from among the candidate signals.

A third suitable error measure and associated algorithm that can be incorporated in the choice modules of FIGS. 3, 5, 6, 7 or 9 determines and compares a least mean square value over a selected time interval {t1, t2}

$$\text{LMS}\{r(t), t_1, t_2\} = \int_{t_1}^{t_2} \{r(t) - r_0\}^2 dt \quad (25)$$

for the three signals r(t)=|s₊(t)|, r(t)=|s₋(t)| and r(t)=|s(t)+n₃(t)| to determine the appropriate choice of output signal for the apparatus. The value r0 can be set equal to zero, in which case the LMS algorithm produces a minimum power choice for the chosen signal. Alternatively, the value r0 can be chosen to be a pth power mean value of the input signal $$r0 = \left\{ \int_{t_1}^{t_2} \{r(t)\}^p dt \right\}^{1/p} / (t2 - t1) \ (p > 0). \quad (26)$$

Interesting choices here include p=1 and p=2. Other physically meaningful choices for the value r0 can also be made. The cumulative variation algorithm or the least mean squares algorithm discussed here can also be used with any of the embodiments shown in FIGS. 3, 5, 6, 7 and 9; that is, the parameters α, φ, ψ1, ψ2 and/or ψ in the output functions r(t)=S₁(t), S₂(t;φ,α), S₃(t;φ,α), S₄(t;ψ1,ψ2,α) or S₅(t;φ,α) set forth in Eqs. (5), (7), (8),(10) or (11) can be determined by one of these algorithms.

Any of the three preceding error measures and associated algorithms can be applied to the output functions r(t)=S₁(t), S₂(t;φ,α), S₃(t;φ,α), S₄(t;ψ1,ψ2,α) or S₅(t;ψ,α)) set forth in Eqs. (5), (7), (8), (10) or (11).

Optimization with respect to the magnitude and/or phase of a signal r(t) may be replaced by optimization with respect to the real part or the imaginary part of the signals, with the same quantitative measure of error being used. This approach compares the combination signals Re{s₊(t)}, Re{s₋(t)} and Re{s(t)+n₃(t)} or the combination signals Im{s₊(t)}, Im{s₋(t)} and Im{s(t)+n₃(t)} for a chosen quantitative measure of error, such as displacement from the median, least mean squares value, or minimum variation.

Another approach compares the combination signals w |s₊(t)|+(1−w) phase{s₊(t)}
and
w |s₋(t)|+(1−w) phase{s₋(t)}
and w|s(t)+n₃(t)|+(1−w) phase{s(t)+n₃(t)}, where w is a selected real or complex constant, and chooses as the optimized output signal the combination with the smallest quantitative error according to a selected error measure.

We claim:

1. A method for removing impulse noise from a circuit electrical signal s(t) that includes a desired signal $s_0(t)$ plus a noise signal n(t), where each component may vary with time t, the method comprising the steps of:

receiving a circuit input signal that is a sum of a desired signal $s_0(t)$ plus a noise signal n(t) that includes impulse noise from a circuit electrical signal, where the noise signal n(t) is to be determined;

passing the circuit input signal through a bandpass filter, with a selected frequency passband PB, to form a bandpassed signal;

passing the bandpassed signal through a first selected signal processing channel that has frequency support contained in a first frequency band having a central frequency $\omega_1$, to produce a first noise signal $n_1(t)$;

passing the bandpassed signal through a second selected signal processing channel that has frequency support contained in a second frequency band, having a central frequency $\omega_2$, that is spaced apart from and does not overlap any part of the first frequency band, to produce a second noise signal $n_2(t)$;

passing the bandpassed signal through a third selected signal processing channel that has a third frequency band, having a central frequency $\omega_3$, that is spaced apart from and does not overlap any part of the first frequency band and the second frequency band, to produce a third channel output signal $s(t)+n_3(t)$, where the third channel has frequency support contained in the third frequency band that includes substantially all frequencies that contribute to the desired signal $s(t)$, and where the frequencies $\omega_1$, $\omega_2$ and $\omega_3$ lie in the selected frequency pass band PB;

where the first, second and third selected channels include frequency shift by selected first, second and third shift frequencies, respectively, and include passage through a low pass filter with selected first, second and third roll-off frequencies, respectively, to form first, second and third channel output signals, respectively;

forming a combined signal that is a symmetric, homogeneous function $HS\{n_1(t), n_2(t); \theta\}$ of degree one from the first and second channel output signals, where the first and second channel output signals have m adjustable parameters $\theta=(\theta 1, \ldots ,\theta m; m=1 \text{ or } 2)$;

forming a linear combination signal $LC\{HS\{n_1(t), n_2(t); \theta\}; s(t)+n_3(t)\}$ of the combined signal $HS\{n_1(t), n_2(t); \theta\}$ and the third channel output signal $s(t)+n_3(t)$;

adjusting the parameters $\theta$ whereby the linear combination signal $LC\{HS\{n_1(t), n_2(t); \theta\}; s(t)+n_3(t)\}$ provides a best possible estimate of the desired signal $s(t)$, according to a selected criterion, for an optimal choice $\theta=\theta_0$ of these parameters; and issuing the linear combination signal $LC\{HS\{n_1(t), n_2(t); \theta=\theta_0\}; s(t)+n_3(t)\}$ as an estimate of the desired signal $s(t)$.

2. The method of claim 1, further comprising the step of choosing as said selected criterion minimization of the difference between the present value $LC\{HS\{n_1(t), n_2(t); \theta\}; s(t)+n_3(t)\}$ and the median value $Med\{s(t)+n_3(t); t_1,t_2\}$ with respect to said parameters $\theta$ over a selected time interval $t_1 \leq t \leq t_2$, where Med denotes the median value of a set of sampled values of said third output channel signal $s(t)+n_3(t)$ over the selected time interval.

3. The method of claim 1, further comprising the step of choosing as said selected criterion minimization of the value $LMS\{LC\{HS\{n_1(t), n_2(t); \theta\}; s(t)+n_3(t)\}; t_1, t_2\}$ with respect to said parameters $\theta$ over a selected time interval $t_1 \leq t \leq t_2$, where LMS denotes the least mean squares variation of the function $r(t)=LC\{HS\{n_1(t), n_2(t); \theta\}; s(t)+n_3(t)\}$ over the selected time interval.

4. The method of claim 3, wherein minimization of said value $LMS\{LC\{HS\{n_1(t), n_2(t); \theta\}; s(t)+n_3(t)\}; t_1, t_2\}$ is implemented by minimization of the value of the integral $$LMS = \int_{t_1}^{t_2} \{LC\{HS\{n_1(t), n_2(t); \theta\}; s(t)+n_3(t)\} - r_0\}^2 \, dt$$

with respect to said parameters $\theta$, where $r_0$ is a selected constant.

5. The method of claim 4, further comprising the step of selecting said constant $r_0=0$.

6. The method of claim 4, further comprising the step of selecting said constant $r_0$ to be the value $$r_0 = \left\{ \int_{t_1}^{t_2} \{s(t) + n_3(t)\}^p \, dt \right\}^{1/p} /(t_2 - t_1),$$

where p is a selected positive constant.

7. The method of claim 1, further comprising the step of choosing as said selected criterion minimization of the value $Var\{LC\{HS\{n_1(t), n_2(t); \theta\}; s(t)+n_3(t)\}; t_1, t_2\}$ with respect to said parameters $\theta$ over a selected time interval $t_1 \leq t \leq t_2$, where Var denotes the cumulative variation of the function $r(t)=LC\{HS\{n_1(t), n_2(t); \theta\}; s(t)+n_3(t)\}$ over the selected time interval.

8. The method of claim 1, further comprising the steps of choosing as said linear combination signal LC and said homogeneous symmetric function HS the combination $LC\{HS\{n_1(t), n_2(t); \theta\}; s(t)+n_3(t)\}=s(t)+n_3(t)+\theta \{n_1(t) n_2(t)\}^{1/2}$, where m=1 and said parameter $\theta$ has three possible values, $\theta=\pm 1$ and $\theta=0$.

9. The method of claim 1, further comprising the steps of choosing as said linear combination signal LC and said homogeneous symmetric function HS the combination $LC\{HS\{n_1(t), n_2(t); \theta\}; s(t)+n_3(t)\}=s(t)+n_3(t)+\theta \{n_1(t) n_2(t)\}^{1/2}$, where m=1 and said parameter $\theta=\exp(-j\phi)$ and $\phi$ is a real number $(0 \leq \phi < 2\pi)$.

10. The method of claim 9, wherein said phase angle $\phi$ is determined by the steps of:

determining a phase $\Phi 1$ associated with said signal $n_1(t)$;

determining a phase $\Phi 2$ associated with said signal $n_2(t)$; and determining said phase angle $\phi$ according to the relations
$\phi=b\{\omega_3-(\omega_1+\omega_2)/2\}$,
$b=(\Phi 2-\Phi 1)/(\omega_2-\omega_1)$.

11. The method of claim 1, further comprising the step of choosing as said linear combination signal LC and said homogeneous symmetric function HS the combination $LC\{HS\{n_1(t), n_2(t); \theta\}; s(t)+n_3(t)\}=s(t)+n_3(t)+\theta \{n_1(t)+n_2(t)\}/2$, where m=1 and said parameter $\theta$ has two possible values, $\theta=1$ and $\theta=-1$.

12. The method of claim 1, further comprising the step of choosing as said linear combination signal LC and said homogeneous symmetric function HS the combination $LC\{HS\{n_1(t),n_2(t); \theta\}; s(t)+n_3(t)\}=s(t)+n_3(t)+\theta \{n_1(t)+n_2(t)\}/2$, where said parameters $\theta=\alpha \exp(-j\psi)$ and $\alpha$ and $\psi$ are real numbers with $0 \leq \psi < 2\pi$.

13. The method of claim 1, wherein m=2, further comprising the step of choosing as said linear combination signal LC and said homogeneous symmetric function HS the combination $LC\{HS\{n_1(t),n_2(t); \theta\}; s(t)+n_3(t)\}=s(t)+n_3(t)-\{\exp(-j\psi 1) n_1(t)+\exp(-j\psi 2) n_2(t)\}/2$, where said two parameters $\theta 1=\exp(-j\psi 1)$ and $\theta 2=\exp(-j\psi 2)$, and $\psi 1$ and $\psi 2$ are real numbers lying in the interval $0 \leq \psi i < 2\pi$ (i=1,2).

14. The method of claim 13, wherein said phase angles $\psi 1$ and $\psi 2$ are determined by the steps of:

determining a phase $\Phi 1$ associated with said signal $n_1(t)$;

determining a phase $\Phi 2$ associated with said signal $n_2(t)$; and determining said phase angles $\psi 1$ and $\psi 2$ according to the relations
$\psi 1 = b(\omega_3 - \omega_1)$,
$\psi 2 = b(\omega_3 - \omega_2)$,
$b = (\Phi 2 - \Phi 1)/(\omega_2 - \omega_1)$.

15. The method of claim 1, further comprising the steps of:

choosing as said homogeneous symmetric function HS the function $HS(n_1, n_2; \theta 1, \theta 2) = \{A (\theta 1\ n_1)^h + B (\theta 2\ n_2)^h\}^{1/h} \exp\{C(\theta 2\ n_2/\theta 1\ n_1)^k\}$, where h and k are selected real, non-zero numbers and A, B, and C are selected numbers; and choosing as said linear combination signal LC the signal $LC\{HS\{n_1(t), n_2(t);\ \theta\};\ s(t) + n_3(t)\} = s(t) + n_3(t) + \theta HS\{n_1(t),\ n_2(t)\}$, where said parameters $\theta = \alpha \exp(-j\phi)$ and $\alpha$ and $\phi$ are real numbers ($0 \leq \phi < 2\pi$).

16. The method of claim 1, further comprising the steps of:

passing said circuit input signal through a second bandpass filter with a second selected frequency passband; and shifting the output signal of the second bandpass filter by a selected fourth frequency shift to produce a frequency shifted bandpassed signal that is passed to said first bandpass filter.

17. A method for removing impulse noise from a circuit electrical signal that includes a desired signal $s_0(t)$ plus a noise signal $n(t)$, where each component may vary with time t, the method comprising the steps of:

receiving a circuit input signal that is a sum of a desired signal $s_0(t)$ plus a noise signal $n(t)$ that includes impulse noise from a circuit electrical signal, where the noise signal $n(t)$ is be determined;

passing the circuit input signal through a bandpass filter, with a selected frequency passband, to form a bandpassed output signal;

passing the bandpassed output signal through a first selected signal processing channel that has frequency support contained in a first frequency band having a central frequency $\omega_1$, to produce a first noise signal $n_1(t)$;

passing the bandpassed output signal through a second selected signal processing channel that has frequency support contained in a second frequency band, having a central frequency $\omega_2$, that is spaced apart from and does not overlap any part of the first frequency band, to produce a second noise signal $s(t) + n_2(t)$, where the second channel has frequency support contained in a second frequency band that includes substantially all frequencies that contribute to the desired signal $s(t)$;

where the first and second selected channels include frequency shift by selected first and second shift frequencies, respectively, and include passage through a low pass filter with selected first and second roll-off frequencies, respectively, to form first and second channel output signals, respectively;

forming a linear combination signal $LC\{n_1(t), s(t) + n_2(t); \theta\}$ of the first channel output signal $n_1(t)$ and the second channel output signal $s(t) + n_2(t)$, where this linear combination has m adjustable parameters $\theta = (\theta 1, \ldots, \theta m;\ m = 1$ or $2)$;

adjusting the parameters $\theta$ whereby the linear combination signal $LC\{n_1(t), s(t) + n_2(t); \theta\}$ provides a best possible estimate of the desired signal $s(t)$, according to a selected criterion, for optimal choices $\theta = \theta_0$ of these parameters; and issuing the linear combination signal $LC\{n_1(t), s(t) + n_2(t); \theta = \theta_0\}$ as an estimate of the desired signal $s(t)$.

18. The method of claim 17, further comprising the step of choosing as said selected criterion minimization of the difference between the present value $LC\{n_1(t), s(t) + n_2(t); \theta\}$ and the median value $Med\{s(t) + n_2(t); t_1, t_2\}$ with respect to said parameters $\theta$ over a selected time interval $t_1 \leq t \leq t_2$, where Med denotes the median value of the set of sampled values of the function $r(t) = s(t) + n_2(t)$ over the selected time interval.

19. The method of claim 17, further comprising the step of choosing as said selected criterion minimization of the value $LMS\{LC\{n_1(t), s(t) + n_2(t); \theta\}; t_1, t_2\}$ with respect to said parameters $\theta$ over a selected time interval $t_1 \leq t \leq t_2$, where LMS denotes the least mean squares variation of the function $r(t) = LC\{n_1(t), s(t) + n_2(t); \theta\}$ over the selected time interval.

20. The method of claim 19, wherein minimization of said value $LMS\}LC\}n_1(t), s(t) + n_2(t); \theta\}$ is implemented by minimization of the value of the integral $$LMS = \int_{t_1}^{t_2} \{LC\{\{n_1(t), s(t) + n_2(t); \theta\} - r_0\}^2\ dt$$

with respect to said parameters $\theta$, where $r_0$ is a selected constant.

21. The method of claim 20, further comprising the step of selecting said constant $r_0 = 0$.

22. The method of claim 20, further comprising the step of selecting said constant $r_0$ to be the value $$r_0 = \left\{ \int_{t_1}^{t_2} \{s(t) + n_3(t)\}^p\ dt \right\}^{1/p} /(t_2 - t_1),$$

where p is a selected positive constant.

23. The method of claim 17, further comprising the step of choosing as said selected criterion minimization of the value $Var\{LC\{n_1(t), s(t) + n_2(t); \theta\}; t_1, t_2\}$ with respect to said parameters $\theta$ over a selected time interval $t_1 \leq t \leq t_2$, where Var denotes the cumulative variation of the function $r(t) = LC\{n_1(t), s(t) + n_2(t); \theta\}$ over the selected time interval.

24. The method of claim 17, further comprising the step of:

choosing as said linear combination signal LC the signal $LC\{n_1(t), s(t) + n_2(t); \theta\} = s(t) + n_2(t) + \theta\ n_1(t)$, where m=1, said parameter $\theta 1 = \exp(-j\phi)$ and $\phi$ is a real number ($0 \leq \phi \leq 2\pi$).

25. The method of claim 17, further comprising the steps of:

passing said bandpassed signal through a third selected filter, where the third filter has frequency support contained in a third frequency band, having a central frequency $\omega_3$, that is spaced apart from and does not overlap any part of, said first frequency band or said second frequency band, to produce a third noise signal $n_3(t)$;

determining a phase $\Phi 1$ associated with said signal $n_1(t)$;

determining a phase $\Phi 3$ associated with said signal $n_3(t)$; and determining said phase angle $\phi$ according to the relations
$\phi = b(\omega_2 - \omega_1)$,
$b = (\Phi 3 - \Phi 1)/(\omega_3 - \omega_1)$.

26. The method of claim 17, further comprising the steps of:

passing said circuit input signal through a second bandpass filter with a second selected frequency passband; and shifting the output signal of the second bandpass filter by a selected fourth frequency shift to produce a frequency shifted bandpassed signal that is passed to said first bandpass filter.

* * * * *